Nov. 24, 1964   L. I. PICKERT   3,158,410
FLUID PRESSURE BRAKE APPARATUS
Filed Aug. 8, 1962
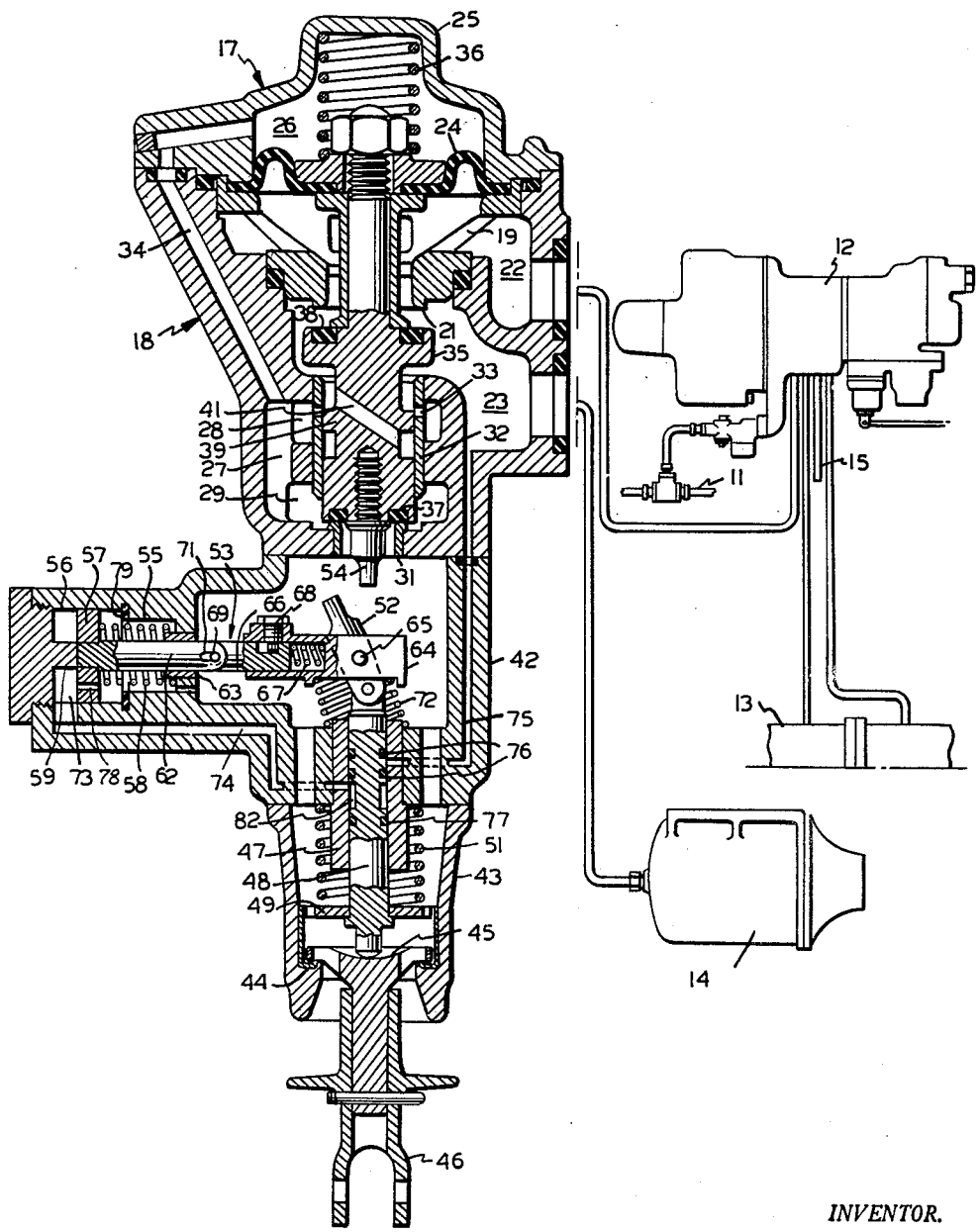
INVENTOR.
LYNN I. PICKERT
BY Dodge and Sons
ATTORNEYS

3,158,410
FLUID PRESSURE BRAKE APPARATUS
Lynn I. Pickert, Watertown, N.Y., assignor to The New York Air Brake Company, a corporation of New Jersey
Filed Aug. 8, 1962, Ser. No. 215,555
3 Claims. (Cl. 303—69)

This invention relates to an improved brake cylinder release valve for fluid pressure brake systems. Specifically, it relates to an actuator assembly which protects against accidental and undesired operation of the release valve.

A brake cylinder release valve is a valve interposed between the control valve and the brake cylinder of a fluid pressure brake system which may be manually operated to release air only from the brake cylinder while retaining the pressure present in the remainder of the brake equipment. Customarily, it includes a main valve shiftable between a normal position in which it interconnects the brake cylinder and the remainder of the brake equipment through a control pipe and a release position in which the brake cylinder pressure is released and the control pipe is closed. The release valve is yieldingly biased to its normal position and held in release position by a pressure motor which is energized by pressure from the control pipe.

The conventional means for actuating such a release valve includes a thrust rod which may be manually reciprocated to move the release valve to release position. It has been urged that the release valve can be inadvertently actuated either by unauthorized persons or by obstructions alongside the right of way. The present invention was conceived to overcome this possible shortcoming of the release valves known in the prior art.

Essentially, the invention concerns an actuator which requires two separate acts to be performed within a prescribed time interval in order to actuate the main valve. In the preferred embodiment, the actuator is incapable, upon initial movement, of unseating the main valve. This idle stroke of the actuator changes the linkage between the actuator and the main valve in such a way that a second stroke of the actuator, if effected within predetermined time after the first, will move the release valve toward its release position.

The preferred embodiment of the invention will be described having reference to the accompanying drawing in which the release valve is shown in axial section and which includes a diagrammatic showing, on a smaller scale, of the brake control equipment of a single car. The various ports, passages and chambers are shown in the drawing as if they lay in a common plane so that the drawing could be simplified. In actual practice, other arrangements of the parts can be used.

Typically, and as shown in the drawing, the fluid pressure brake controlling equipment of a single car includes a brake pipe 11, a control valve 12 (the standard AB triple valve is shown), a supply reservoir 13 (the standard dual AB reservoir including auxiliary and emergency reservoir portions is shown), a brake cylinder 14 and a release pipe 15.

The present invention is concerned with an improved brake cylinder release valve shown at 17. Such a release valve includes a main housing casting 18, cored as shown to receive valve seat insert 19 which carries on its lower face a valve seat 21. This valve seat lies between a control pipe chamber 22 and a brake cylinder chamber 23. The upper side of the control pipe chamber 22 is closed by slack, flexible diaphragm 24. Diaphragm 24 is clamped in place at its outer periphery by a cap 25 secured to housing 18. A motor chamber 26 is formed in cap 25 above the diaphragm.

A vent valve chamber 27 is formed in the lower portion of housing 18 and includes upper and lower annular chambers 28 and 29. A vent valve seat 31 is pressed into housing 18 beneath the vent valve chamber 27. A guide bushing 32 is pressed into the housing as shown and includes radial ports 33. A passage 34 extends from the vent valve chamber 27 to the motor chamber 26.

Flow through the release valve 17 is controlled by a double beat poppet valve 35. Valve 35 includes an axial stem by which it is secured to the diaphragm 24 as shown. The valve 35 and diaphragm 24 are biased toward the illustrated normal position by a light spring 36. A downward presented valve face 37 is formed on the lower end of valve 35, and an upward presented valve face 38 is carried at its upper end. As shown, the main valve has reduced diameter portions separated by a land 39. A metering port 41 extends through valve 35 between the reduced diameter portions.

The portions of the release valve described in the preceding three paragraphs are known in the art and shown in prior patents such as the Klein Patent No. 2,444,993, issued July 13, 1948, to applicant's assignee.

According to the present invention, a motor housing 42 is attached to the lower face of the release valve body 18. An actuator housing 43 is attached to the lower face of the housing 42. Actuator housing 43 is provided at its lower end with an inturned flange 44 which is engaged by the periphery of the universally tilting head 45 of the actuator assembly 46. A guide bushing 47 is pressed into an opening in the lower face of the housing 42. The bore of bushing 47 is aligned axially with the main valve 35 of the brake cylinder release valve 17. A combined push rod and valve 48 is mounted in the guide bushing 47 and has a follower 49 attached to its lower end. A spring 51 reacts between the follower 49 and the lower face of the housing 42 and urges the combined push rod and valve 48 downward into thrust engagement with tilting head 45. A swinging link 52 is pivotally mounted on the upper end of the combined push rod and valve 48. The position of the link 52 is controlled by fluid pressure operated means generally indicated by the reference numeral 53.

In the illustrated position, link 52 is inclined so that its upper end is offset from the axial extension 54 of main valve 35. The fluid pressure operated means 53 includes a cylinder bore 55 formed in the housing 42, which is counterbored as shown at 56. A piston 57 is reciprocable in counterbore 56 and is biased by spring 58 toward the illustrated position in which the piston engages the stop 59 formed on the plug which closes the open end of counterbore 56. The stem 62 of piston 57 is guided by bushing 63. A cross-link 64 is pivotally connected by pin 65 to the swinging link 52. The end of this cross-link 64 is provided with a bore which receives the end of connector link 66. Connector link 66 is biased by the spring 67 to the position shown in which it engages the stop 68, limiting the link's motion outward of the bore in cross-link 64. Connector link 66 is pivotally connected to the end of piston stem 62 by a pin 69 which works in the slot 71 formed in the end of piston stem 62. A light spring 72 reacts between the lower face of the cross-link 64 and the housing 42 as shown.

Pressure fluid may be supplied to the motor working space 73, through passages 74 and 75 which are controlled by the combined push rod and valve 48. As shown in the drawings, the passage 75 extends from the brake cylinder chamber 23 and is normally blanked off by the combined push rod and valve 48. Leakage along the surface of the combined push rod and valve 48 is prevented by conventional O-ring seals 76 as shown.

The passage 74 communicates at all times with an annular chamber 82 formed in the surface of the combined push rod and valve 48. A third O-ring 77 encircles the combined push rod and valve beneath the chamber 82. The piston 57 of the operating means 53 is provided with a restricted vent opening 78. An annular sealing surface 79 is provided on the shoulder between the bore 55 and the counterbore 56.

*Operation*

To operate brake cylinder release valve 17, actuator assembly 46 is shifted laterally to move the combined push rod and valve 48 upward. Because the swinging link 52 is normally in the position illustrated, this upward movement of the combined push rod and valve 48 will not shift the main valve 35. This movement of the push rod and valve 48 does however establish communication between the passages 75 and 74 whereby pressure from the brake cylinder chamber 23 is admitted to the working chamber 73 causing the piston 57 to move to the right against the seal 79. This movement of piston 57 swings link 52 which, because it has been elevated, will strike the side of the extension 54 of the main valve 35. Thus, the combined push rod and valve 48 will not be effective to shift valve 35. Although the swinging link 52 does not under these conditions move full stroke, the piston 57 may move full stroke because of the lost motion provided by the slot 71 and by movement of the connector link 66 in the bore in the cross-link 64.

After charging the working chamber 73, the operator releases the actuator 46 and the combined push rod and valve 48 will return to its illustrated position. This will cut off communication between passages 75 and 74. The pressure in working space 73 is not vented by this movement, and the piston 57 will remain in position against the sealing surface 79 and the springs 67 and 72 will move link 52 to an erect position. If the actuating assembly 46 is again displaced, before pressure is completely dissipated from working chamber 73 through restricted vent 78, the brake cylinder release valve will move toward its release position. Upon initial movement toward release position, the vent valve chamber 27 and motor chamber 26 are quickly vented. Air under pressure in the control pipe chamber 22 and brake cylinder chamber 23 is simultaneously vented through metering port 41 but at a much slower rate than is the pressure in chambers 26 and 27. The difference thus created between the pressures in chambers 22 and 26 will move main valve 35 fully to release position. In this position, pressure in chamber 22 is captive and the release valve will remain in release position. The brake cylinder release valve will reset in the normal way when the control valve is shifted from application to release position causing the control pipe and the associated control pipe chamber 22 to be vented. The fluid pressure operated means 53 will return to its illustrated position as soon as the pressure has been bled from working space 73.

It will be seen that two distinct movements of the lever 46 are required in order to move the release valve to release position and these two movements must occur within a definite time period. A similar result may be attained by providing a separate manually-operated valve for motor 53, but the illustrated embodiment is preferred because of its simplicity, and the more positive assurance against inadvertent actuation.

The invention is not limited to the illustrated embodiment and except as stated in the claims, no such limitation should be inferred.

I claim:

1. In a brake cylinder release valve, adapted for interposition between the control valve and brake cylinder of a fluid pressure brake controlling system, of the type including a valve housing having therein a control pipe chamber, for connection to the control pipe of the control valve, a brake cylinder chamber, for connection with the brake cylinder, and an exhaust connection, a main valve means shiftable between a normal position in which the chambers are interconnected, but isolated from the exhaust connection and a release position in which the control pipe chamber is isolated from the brake cylinder chamber and the brake cylinder chamber is connected with the exhaust passage, and fluid pressure operated means effective to maintain the main valve means in release position when control pipe chamber pressure exceeds brake cylinder chamber pressure, the improvement which comprises means to shift the main valve means toward release position comprising in combination:

(a) a manually operable thrust member having a first position in which it is ineffective to shift said main valve means toward release position and a second position;

(b) means normally ineffective but capable of being rendered effective to connect said thrust member operatively with the main valve means, whereby the main valve means may be shifted from normal toward release position by the thrust member;

(c) a fluid pressure motor capable when energized and only when the thrust member is in first position of rendering the normally ineffective means effective; and (d) means connected with said thrust member to energize said motor when the thrust member is in second position and to maintain said motor energized for a predetermined interval of time after the thrust member is returned to first position.

2. In a brake cylinder release valve, adapted for interposition between the control valve and brake cylinder of a fluid pressure brake controlling system, of the type including a valve housing having therein a control pipe chamber, for connection to the control pipe of the control valve, a brake cylinder chamber, for connection with the brake cylinder, and a vent valve chamber, an exhaust connection, a main valve means shiftable between a normal position in which the chambers are interconnected, but isolated from the exhaust connection and a release position in which the control pipe chamber is isolated from the other chambers and the other chambers are connected with the exhaust passage, and fluid pressure operated means effective to maintain the main valve means in release position when control pipe chamber pressure exceeds brake cylinder chamber pressure, the improvement which comprises means to shift the main valve means toward release position comprising in combination:

(a) a manually operable thrust member having first and second positions;

(b) means normally ineffective but capable of being rendered effective to connect said member operatively with the main valve means, whereby the main valve means may be shifted from normal toward release position by the thrust member;

(c) a fluid pressure motor effective when energized and only when the thrust member is in first position to render the normally ineffective means effective; and (d) means connected with said member to energize the motor when the member is in second position and to maintain the motor energized for a predetermined interval time after the member is returned to first position.

3. In a brake cylinder release valve, adapted for interposition between the control valve and brake cylinder of a fluid pressure brake controlling system, of the type including a valve housing having therein a control pipe chamber, for connection to the control pipe of the control valve, a brake cylinder chamber, for connection with the brake cylinder, and a vent valve chamber, an exhaust connection, a main valve means shiftable between a normal position in which the chambers are interconnected, but isolated from the exhaust connection and a release position in which the control pipe chamber is isolated from the other chambers and the other chambers are connected with the exhaust passage, and fluid pressure operated means effective to maintain the main valve means in release position when control pipe chamber pressure exceeds brake cylinder chamber pressure, the improvement which comprises means to shift the main valve means toward release position comprising in combination:
(a) first manually operable means normally ineffective to shift said main valve means toward release position;
(b) a fluid pressure motor having a restricted vent and effective only when actuated to render said manually operable means effective; and
(c) manually operable valve means to admit pressure fluid from the brake cylinder to the motor to actuate the motor.

References Cited in the file of this patent
UNITED STATES PATENTS
2,725,261    Pickert et al. _____ Nov. 29, 1955